(12) United States Patent
Gerlach

(10) Patent No.: US 8,179,653 B2
(45) Date of Patent: May 15, 2012

(54) MULTIPLE OPERATING VOLTAGE ELECTRICAL SURGE PROTECTION APPARATUS

(75) Inventor: Michael J. Gerlach, Riverview, FL (US)

(73) Assignee: Advanced Protection Technologies, Inc., Clearwater, FL (US)

( * ) Notice: Subject to any disclaimer, the term of this patent is extended or adjusted under 35 U.S.C. 154(b) by 478 days.

(21) Appl. No.: 12/491,515

(22) Filed: Jun. 25, 2009

(65) Prior Publication Data

US 2010/0014205 A1    Jan. 21, 2010

Related U.S. Application Data

(60) Provisional application No. 61/081,503, filed on Jul. 17, 2008.

(51) Int. Cl.
*H02H 3/22* (2006.01)
(52) U.S. Cl. ........................................... 361/111
(58) Field of Classification Search .................. 361/111
See application file for complete search history.

(56) References Cited

U.S. PATENT DOCUMENTS

| 6,122,157 A | 9/2000 | Gerlach |
| 2002/0071233 A1* | 6/2002 | Bock et al. ................. 361/127 |
| 2005/0122655 A1* | 6/2005 | Hotchkiss et al. ........... 361/103 |

* cited by examiner

*Primary Examiner* — Jared Fureman
*Assistant Examiner* — Scott Bauer
(74) *Attorney, Agent, or Firm* — GrayRobinson, P.A.

(57) ABSTRACT

A component of an electrical system capable of operation at any of two or more different nominal normal operating voltages is protected from a transient overvoltage condition by an apparatus having at least one phase-to-ground array of surge protection devices (SPDs) connected in series with one another to define a series of tap points on opposite sides of the SPDs and having at least two sets of electrical conductors for coupling the electrical system to a user-selectable one of the tap points which corresponds to a desired one of the nominal operating voltages. An array of capacitors connected electrically in series with one another is connected between each of the tap points and a monitoring circuit to provide impedance for dropping each nominal operating voltage to a suitable voltage for powering the monitoring circuit with low energy loss.

17 Claims, 7 Drawing Sheets

MULTIPLE OPERATING VOLTAGE ELECTRICAL SURGE PROTECTION APPARATUS

CROSS-REFERENCE TO RELATED APPLICATIONS

Priority is claimed under 35 U.S.C. §119(e) to U.S. Provisional Patent Application Ser. No. 61/081,503 filed Jul. 17, 2008, the disclosure of which is expressly incorporated herein by reference in its entirety.

FIELD OF THE INVENTION

This invention relates to the field of protecting alternating current (AC) power distribution systems and loads connected thereto from operating improperly and/or being damaged and/or creating a fire or electrical hazard upon being subjected to transient overvoltage conditions. More particularly, the present invention relates to a transient voltage surge suppression device (TVSPD) which provides effective protection at any of two or more nominal operating voltages in a manner which can be quickly and easily user-selected in the field without necessity of replacing one TVSPD for another.

BACKGROUND OF THE INVENTION

Surge protectors are used in a wide variety of commercial and consumer applications to protect AC power distribution systems and various types of electrical and electronic equipment that receive operating power from such systems. AC power distribution systems and the electrical loads that receive power from such systems can be subjected, often repeatedly, to a potentially damaging and/or hazardous condition commonly referred to as a "power surge." A power surge is characterized by a sudden large transient increase in the magnitude of voltage one would not normally expect to encounter at a given point in the AC power distribution system. Typically caused by lightning strikes or equipment failures of some kind, power surges can damage or destroy electrical insulation systems as well as motors, switches control devices, computer systems, and all other types of electrical or electronic equipment. They may result in fire and/or electrical shock hazards capable of causing death, serious injury, and/or ancillary property damage extending beyond the limits of the electrical system or equipment subjected to the power surge itself.

In order to prevent or mitigate the effects of power surges, various types of TVSPD units are known in the prior art. TVSPD units commonly include any of various kinds of devices which, at voltages within normal ranges of the nominal operating voltages of the AC electrical system or device they are intended to protect, exhibit relatively high electrical impedance, but which, upon being subjected to a voltage of sufficiently high magnitude, exhibits a significantly lower impedance and conduct electrical current relatively readily. Non-limiting examples of various types of SPDs include varistors, silicon avalanche diodes, zener diodes, selenium cells, gas discharge tubes, and high voltage capacitors, of which the metal oxide varistor (MOV) is favored for many low voltage applications, such as in AC power distribution systems having normal, nominal operating voltages of about six hundred volts AC (600 VAC) or less and medium voltage applications which typically operate at up to about four thousand one hundred sixty volts AC (4,160 VAC). Although they are referred to by various names, such devices are often called "surge protection devices" (SPDs). As used herein and in the appended claims, the term "surge protection device" or "SPD" is to be construed broadly to refer to any type of device that exhibits suitable voltage-dependent impedance characteristics, regardless of whether the device is of a presently known type or one that is developed in the future.

In addition to SPDs, surge protectors optionally include one or more thermal or overcurrent protectors. As used herein and in the appended claims, the term "overcurrent protector" refers to a fuse, circuit breaker or any presently known or future developed device for interrupting or limiting the flow of an abnormally large electrical current. To be similarly broadly construed, "thermal protector" is to be construed broadly to refer to any type of device which, in normal operation, exhibits a relatively low electrical impedance, but which, upon being subjected to temperatures above a threshold value, opens the circuit entirely or exhibits a significantly higher impedance and substantially prevents the flow of electrical current. Non-limiting examples of various types of thermal protectors include thermal fuses, bimetal thermostats, thermal cutoffs, thermal cutouts, and thermal links.

A surge protector which includes SPDs as well as overcurrent and thermal protectors is disclosed in U.S. Pat. No. 6,122,157 to Gerlach, which is expressly incorporated herein by reference in its entirety to form a part hereof.

Transient overvoltage protectors of the prior art readily accommodate transient voltages of varying magnitude but are quite limited with respect to the range of voltages at which they can operate properly for sustained periods under normal conditions. Relatively small deviations or fluctuations of normal operating voltages from a specified rated or "nominal" input voltage are expected. These have generally not been a problem. However, in order to accommodate a change from one normal operating voltage to a significantly different normal operating voltage, it has typically been necessary to remove and replace a previously installed TVSPD unit with one having a normal operating voltage rating which corresponds to the new normal operating voltage. Doing so, entails not only the expense of purchasing a new surge protector, but also the time, lost production, labor expense necessary to remove the old device and install a different one.

One scenario which has required the removal and replacement of surge protectors is that in which one electrical load device is physically removed and substituted for another load having a need for a different nominal input voltage than the load device that was removed. For example, replacing a 1,000 volt AC motor with a new 4,160 volt AC motor would also require complete replacement of the TVSPD. An example of an application where this routinely occurs is that of motors used to drive pumps at wellheads in the oil and gas industry. Motor horsepower requirements can vary dramatically from one well to the next and often change over time at a given well as conditions change. Pumping material from increasingly greater depths and/or pumping material of greater viscosity imposes greater demand on the motor. The mechanical load on the motor can also increase as the pump, and the bearings in the motor itself wear over time.

It is a common practice to compensate for such changing conditions by replacing a motor with one having a different nominal operating voltage when operating conditions change. It is not at all uncommon for a drilling operation to use a variety of different motors whose nominal input voltage requirements may span a range of four-to-one (4:1) or more. That is, a given motor may operate at a nominal input voltage that may be more than double, or even more than quadruple the voltage used to drive a different motor. A prior art surge protector suitable for protecting the pump motor at a nominal 1,000 VAC input voltage is unsuitable if the motor input voltage is a nominal value of 2,400 VAC. The TVSPD used initially must be removed and replaced entirely when such a change is made. If the motor voltage is later changed again, for example, to one having a nominal input voltage of 4,160 VAC, the second TVSPD must again be removed and replaced with yet a third one, and so on. The time, effort and monetary cost of carrying out such replacement of TVSPDs has been substantial. The prior art has not provided a surge protection apparatus which overcomes those drawbacks and can provide effective transient voltage surge at two or more nominal input voltages which may differ substantially from one another.

A TVSPD unit which has failed, cannot perform its intended function but the failure may not be known until a load device which would otherwise have been protected is destroyed by a lightning strike or other transient overvoltage condition. In the oil and gas industry and other applications, TVSPD units are frequently located in remote locations or ones which are otherwise difficult to access. In such cases, it has heretofore been a problem to monitor the operational status of the TVSPD in a simple, economical and reliable manner.

SUMMARY OF THE INVENTION

The invention provides a transient voltage surge suppressor apparatus which is capable of providing effective transient overvoltage protection of AC power distribution systems and loads operating at any of two or more selectable nominal operating voltages.

In a preferred embodiment, a TVSPD apparatus includes a transient overvoltage protection circuit which includes two or more SPDs which are connected in series between the AC line and ground. A capacitor array includes two or more capacitors connected in series. Respective ones of the capacitors corresponding ones of the SPDs are connected in parallel with one another at two or more nodes. The capacitances are selected such that, without exceeding the maximum voltage rating of any of the capacitors, at least two of the nodes are useful as tap points for selectively connecting the TVSPD to provide full line to ground surge protection at one of at least two different respective nominal operating voltages. Optionally, additional SPDs are connected from line-to-line to provide line-to-line surge protection as well. If desired, thermal protection and/or overcurrent protectors can also be provided.

Thus, the invention provides a surge protection apparatus and method which offers effective transient overvoltage protection for AC electrical systems and loads of different nominal operating voltages. Among other advantages, this obviates the need to remove and replace one TVSPD unit with another in order to provide protection when nominal operating voltages change.

According to another aspect of the invention, a preferred embodiment includes a wiring pigtail which extends from inside to a substantial distance outside a housing which encloses the electrical circuit described above. The wiring pigtail includes two or more sets of wires. One end of each wire in each set is electrically coupled to one of the tap points mentioned earlier, so that each set of wires is used to connect the TVSPD unit for operation at a particular nominal operating voltage. Each set is color coded or clearly marked to indicate that voltage. The opposite ends of the sets of wires which are not being used at a given time are preferably terminated in an electrically insulated terminal block.

The wires projecting outside the housing are long enough to permit them to be routed all the way from the TVSPD unit to the inside of whatever type of electrical enclosure is associated with the load to be protected. One set of wires corresponding to the nominal operating voltage desired at a particular time is connected to the load. The free ends of the other sets are held safely in the terminal block until needed.

At the time the TVSPD is initially installed the entire wiring pigtail is routed, generally through conduit or an electrical raceway from the TVSPD to the point at which the electrical connections will be made between the TVSPD and the power line or load to be protected. One set of wires in the pigtail is connected there at its free end. The free ends of the wires in the other set(s) are in the same general vicinity but are held safely inside the terminal block. When the nominal operating voltage is changed, it is only necessary to disconnect one set of wires from the line or load and re-connect the line or load to the TVSPD by way of a different set of wires after removing the latter from the terminal block. Preferably, the set of wires just removed from the load are terminated in the insulated terminal block for safety until they might be needed again. The type of insulation, voltage rating, current rating and other characteristics of each set of wires in the harness are readily tailored in advance to satisfy to the particular operating voltage and other conditions under which they will be used. The wiring pigtail can be as long as necessary but should be kept as short as possible in order to provide the best protection. In the preferred embodiment, the wiring pigtail is on the order of eight to fifteen feet long as supplied to the customer but can be trimmed in the field to suit the application.

Another aspect of the invention provides improved TVSPD monitoring, diagnostics and testing.

In a preferred embodiment, a monitoring and diagnostic circuit coupled to the capacitor array of the multi-tap overvoltage protection circuit provides phase status indicator lights and test points which provide a down-scaled representation of the line phase voltage. Preferably, the scaling provides $\frac{1}{1000}^{th}$ of the phase voltage at the test point thereby allowing the phase voltage to be accurately but safely measured and/or displayed either locally or remotely. The monitoring and diagnostic circuit may also include a surge counter for counting surge events and/or relay circuit which provides dry contacts to allow monitoring locally or from a remote site.

A surge counter according to a preferred embodiment includes surge current sensors in the form of current transformers which generate a surge signal when a surge current flows through the SPDs of the overvoltage protection circuit. This signal is applied to a re-settable surge counter which increments each time a surge signal appears. The surge counter includes a numerical display indicating the number of surge events which have taken place since the counter was last reset.

These and other aspects and advantages of the invention will be made even more clear to a person of ordinary skill upon review of the following detailed description of a preferred embodiment taken in conjunction with the accompanying drawings wherein like reference numerals are used to designate like items.

DETAILED DESCRIPTION

Figure 1:
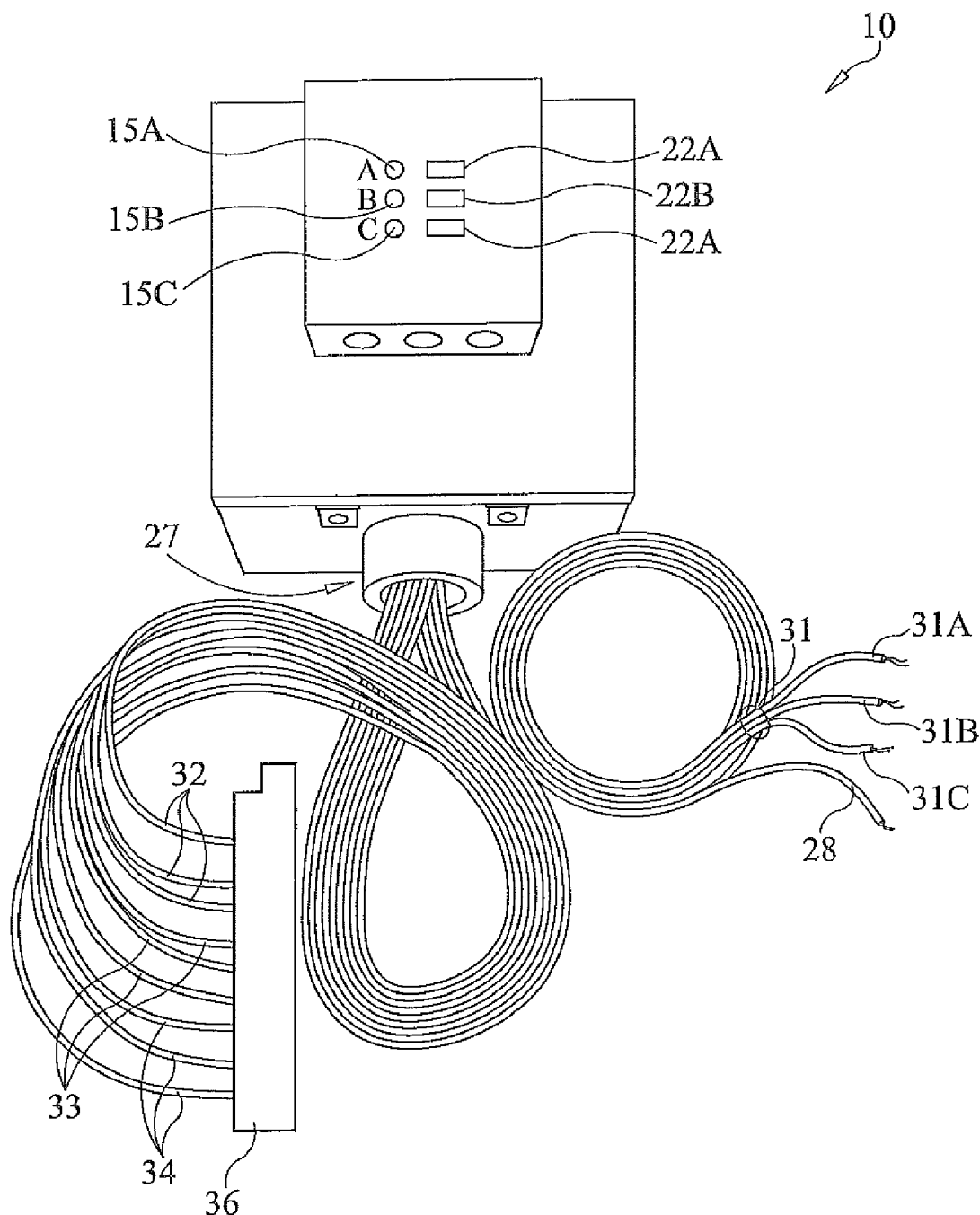
FIG. 1 is a perspective illustration of the exterior of a preferred embodiment of a transient voltage surge suppression device (TVSPD) according to the invention.

A preferred embodiment of a transient voltage surge suppressor unit (TVSPD) 10, is shown in FIG. 1. This particular embodiment of TVSPD 10 is designed for so-called "medium voltage" three-phase applications. Medium voltage applications are generally regarded as those where the nominal normal operating voltage lies between about 1,000 volts AC to about 4,160 VAC. Typical normal operating voltages in the mid voltage range are 1,000 VAC; 3,000 VAC; 3,600 VAC, and 4,160 VAC. It is to be understood however, that the invention is not limited to those voltages or to medium voltage applications.

The operating circuitry of TVSPD 10 which will be described further below is mounted on one or more circuit boards located inside a protective metallic housing 13. Indicator lights 15A, 15B and 15C are mounted for visibility from outside housing 13 and are associated with electrical phases A, B and C of the electrical system to be protected by TVSPD unit 10. Next to each of lights 15B, 15C, 18 is a respective alphanumeric display 22A, 22B, 22C. TVSPD 10 includes a wiring pigtail 26 which extends outwardly from the inside of housing 13 by way of a hub 27. The length of the portion of pigtail 26 that projects outside housing 13 is selected to be sufficient to be routed the entire distance between the mounting location of housing 13 and the location at which TVSPD 10 connects to the electrical load or system to be protected. About five to six feet (5'-6') of free length should be ample in most cases since it is advantageous to mount any TVSPD as close as possible to the point at which it electrically connects to the system to be protected.

Pigtail 26 consists of a green ground wire 28 and a plurality of uniquely color-coded sets 30, 31, 32 and 33 of wires. Each set 30-33 consists of three individual wires each of which is labeled "A," "B" or "C" according to phase. One end of each wire in sets 30-33 terminates inside housing 13 at one of a series of multiple tap points each of which corresponds to a different particular nominal operating voltage. One set, such as set 30, of the wires which make up pigtail 26 is connected to the electrical system to be protected according to the desired normal operating voltage indicated by its color code. The ones of sets 30-33 not being used at a given time are held securely, but removably, in an insulated terminal block 36 since all of them will ordinarily be live when TVSPD 10 is in operation.

Figure 2:
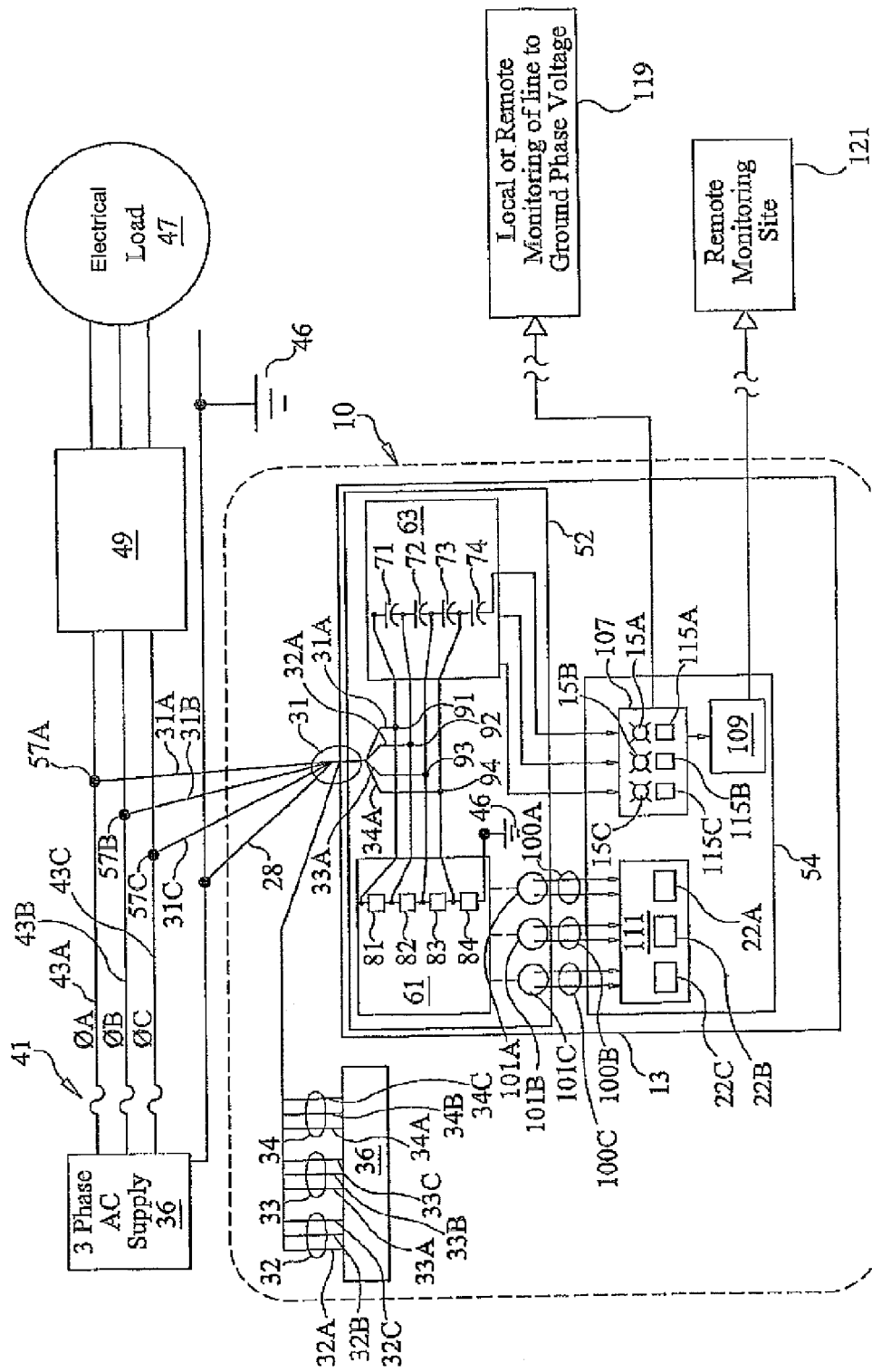
FIG. 2 is a schematic block diagram of the embodiment of FIG. 1 showing same connected for protecting an electrical load in a typical installation.

FIG. 2 is a block diagram which illustrates TVSPD 10, in further detail and shows how it is connected to electrical system components it is intended to protect. A three-phase AC electrical supply 39 is coupled by way of optional but recommended fuses or other overcurrent protection devices 41 to line voltage conductors 43A-43C which carry phase voltages of øA, øB and øC respectively to supply power to an electrical load 47, such as, for example, a three-phase medium voltage electric motor. In most instances, the load 47 will be connected to line conductors 43A-43C by way of a switching device 49 such as a motor starter, fused disconnect switch, or the like which will generally be housed in an electrical enclosure separate of housing 13.

The housing 13 of TVSPD 10 encloses a multi-tap overvoltage protection circuit 52 and a monitoring and diagnostic circuit 54. One end of wiring pigtail 26 is coupled to the multi-tap overvoltage protection circuit 52 in a manner that will be described in further detail with reference to FIG. 3. Ground wire 28 and the three individual phase line wires of the set 30 of wires which corresponds to the particular nominal operating voltage being delivered to load 47 by electrical supply at a given time is connected to line voltage supply conductors 43A-43C as shown. If a transient overvoltage appears on any one or more of line voltage supply conductors 43A-43C, TVSPD 10 will protect load 47 as well as switching device 49 and the wires on the load side of TVSPD 10 from damage by providing a low impedance path between the affected line conductor(s) 43A-43C and ground 46.

Three-phase multi-tap overvoltage protection circuit 52 includes a three-phase array 61 of surge protection devices (SPDs) and a three-phase array 63 of capacitors. Each of the three legs of SPD array 61 includes a plurality of SPDs 81-84 connected electrically in series with one another while each leg of capacitor array 63 includes a plurality of capacitors 71-74 which are likewise connected in series with one another. Each of the capacitors 71-74 is connected across a respective one of the SPDs 81-84 such that the nodes on electrically opposite sides of capacitor/SPD pairs 71, 81 and 72, 82, and 73, 83 and 74, 84 define a series of tap points 91, 92, 93, 94 which are connected to wires associated with a respective one of the four sets 31-34 of wires in pigtail 26. For clarity of illustration, only one of the legs of SPD array 61 and capacitor array 63 is shown in FIG. 2. However, as made more clear by FIG. 3 it will be understood that each array 61 and 63 consists of three legs, one for each of electrical phases A, B and C. Reference numeral suffixes A, B, and C are used herein as phase designators.

As indicated in FIG. 2 by the dashed lines emanating from SPD array 61, wire links 97A, 97B and 97C are connected electrically in series with each leg of SPD array 61. When current flows through one or more of those legs as a result of a transient overvoltage condition, the corresponding link(s) 97A, 97B and/or 97C operate to induce generation of a signal 100A, 100B, 100C by one or more of a corresponding series of surge current sensors 101A, 101B, 101C, which may suitably take the form of current transformers.

In the preferred embodiment, multi-tap overvoltage protection circuit 52 is coupled to diagnostic and monitoring circuit 54. Diagnostic and monitoring circuit 54 includes a power and phase voltage indication and test circuit 107, a relay circuit 109, and a surge counter circuit 111. Circuit 111 drives the alphanumeric displays 22A, 22B, 22C in response to the signals 100A, 100B, 100C received from surge current sensors 101A, 101B, 101C in order to indicate the number of surge events which have taken place on each phase since the most recent re-set of surge counter 111.

The power and phase voltage indication and test circuit 107 receives inputs from each leg of three-phase capacitor array 63. Circuit 107 drives indicator lights 15A, 15B, or 15C. An extinguished indicator light 15A, 15B, or 15C reflects either a loss of phase voltage, a grounded phase, or that that TVSPD unit has failed and that immediate action by service personnel is needed. Circuit 107 also preferably provides a plurality of test points 115A, 115B, 115C from which the phase voltage may be accurately determined. At each test point 115A, 115B, 115C circuit 107 presents a scaled-down fraction of the phase voltage. Preferably, circuit 107 scales down the phase voltage to a suitably small decimal fraction thereof, such as one one-thousandth ($\frac{1}{1000}^{th}$). This enables service personnel to accurately determine phase voltage using an ordinary digital multi-meter or the like. Such measurements can be made either locally at test points 115A, 115B, 115C or, remotely by either a wired connection or wireless telemetry link to a remote location as indicated at 119. Because of the downscaling, the actual voltage level at test points 115A, 115B and 115C is reduced to a safe level.

The power and phase voltage indication and test circuit 107 is coupled to a relay circuit 109 which provides a set of normally open and normally closed relay contacts for remotely monitoring the operational status of each individual phase as well as that of unit 10 overall. By way of these contacts, relay circuit 109 allows the same conditions indicated by lights 15A, 15B, 15C to be monitored at a remote monitoring site 121, which can be the same site as site 119 or a different site entirely.

Figure 3:
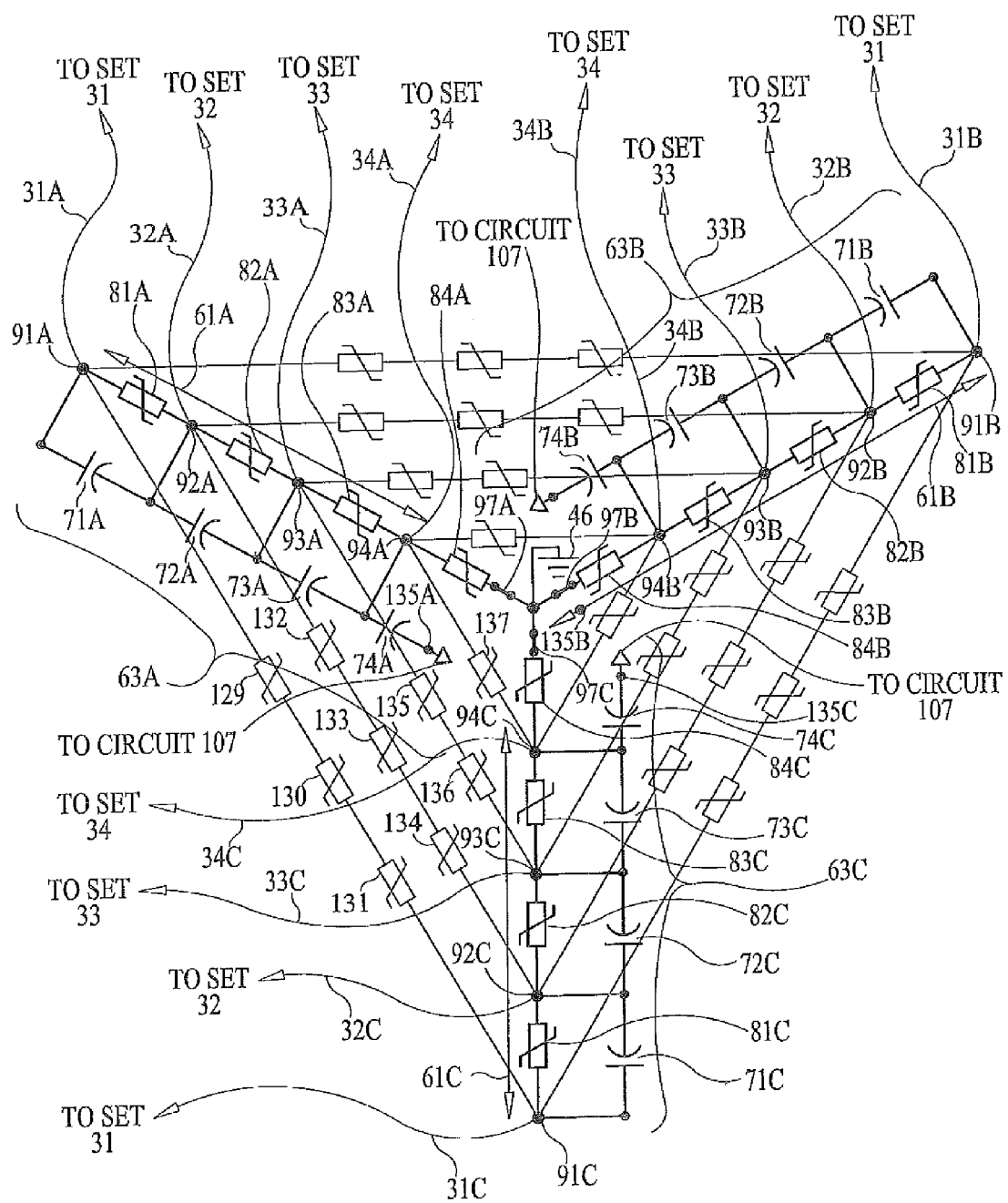
FIG. 3 is an electrical schematic of the multi-tap overvoltage protection circuit of FIG. 2.

As can be seen from FIG. 3, SPD array 61 of multi-tap overvoltage protection circuit 52 includes three legs indicated generally at 61A, 61B, 61C which are connected to one another, and to ground 46, in a grounded "Y" configuration. In the preferred embodiment, each leg 61A, B, C includes four SPDs connected in series with one another as indicated in FIG. 3 by reference numerals 81A-C, 82A-C, 83A-C and 84A-C, respectively. The capacitor array 63 of circuit 52 is also made up of three legs 63A, B, C. Each leg 63A, B, C includes four capacitors 71A-C, 72A-C, 73A-C and 74A-C, respectively which are connected electrically in series with one another. While capacitors 71A-C, 72A-C, 73A-C and 74A-C as well as SPDs 81A-C, 82A-C, 83A-C and 84A-C are shown in FIG. 3 as individual devices, it is to be understood that such can, and generally will, be implemented as series and/or parallel combinations of individual devices as appropriate to meet the needs of a particular application without exceeding voltage or current ratings of such components. since the structure and operation of each is the same with respect to each phase, the remainder of the remainder of the description of the preferred embodiment of TVSPD 10 will normally proceed generally with reference to phase "A."

As illustrated in FIG. 3, SPD array 61 and capacitor array 63 are electrically connected to one another as are capacitor 72A and SPD 82A, and capacitor 73A and SPD 83A, respectively.

Tap points 91A, 92A, 93A and 94A are connected to wires 31A, 32A, 33A and 34A of the respective wire sets 31, 32, 33 and 34 included in wiring pigtail 26. SPDs are selected such that when one of those wire sets is connected to a line of a particular normal operating voltage, the one or more SPDs interposed between ground and that particular one of the tap points 91A, 92A, 93A or 94A will present a very high impedance and not conduct more than minimal current at the normal operating voltage. However, under abnormal conditions when a overvoltage transient appears on the line, those one or more SPDs transition to a low impedance state very rapidly thereby shunting potentially damaging excessive current safely to ground 46. Thus, SPD array 63 provides effective line-to-ground transient overvoltage protection of load 47 at any one of four normal operating voltages depending on which particular one of the wire sets 31, 32, 33 or 34 is connected to the line at a given point in time. As an option, line-to-line overvoltage protection can also be provided by connecting one or more SPDs from line-to-line between corresponding ones of the tap points. For example, a series of three SPDs 129, 130 and 131 are shown connected between the tap points 91A, and 93C and 137 connects tap point 94A to tap point 94C. As shown in FIG. 3, other SPDs are connected correspondingly between the other phases in order to provide line-to-line protection for all three phases.

The capacitors 71A, 72A, 73A and 74A of capacitor array 61 are selected with reference to the power line frequency (typically either 60 Hz or 50 Hz) and the desired normal voltages at which TVSPD 10 is intended to operate. In the preferred embodiment, each respective tap point 91A, 92A, 93A, 94A corresponds to one of a series of progressively descending intended normal operating voltages for example, 4160 VAC, 3000 VAC, 2000 VAC and 1000 VAC, respectively. That is, when device 10 is to be used to protect a line or load normally operating at 4160 VAC, tap points 91A, 91B and 91C will be connected to line voltage conductors 43A, 43B and 43C, respectively. Those connections will be made by one of the sets of wires included in wiring pigtail 26 namely, set 31 as shown in FIG. 2. The remaining ones of the tap points, namely tap points 92A,B,C, 93A,B,C and 94A, B,C are not used. The free ends of the wires in their respective wire sets 32, 33 and 34 remain disconnected and are preferably terminated safely in insulated terminal block 36 until one of them is needed in order to re-configure the wiring connections to operate TVSPD device 10 at a different one of the desired normal operating voltages.

For example, to operate TVSPD 10 at 2000 VAC, only tap points 93A, 93B and 93C would be connected to the line side of load 47 with the wire set 33 of pigtail 26 being used for that purpose. In that case, wire sets 31, 32 and 34 would remain disconnected from the power line and would preferably be terminated at an electrical dead end inside insulated terminal block 36. Terminal block 36 is preferably formed entirely of an electrically insulating material and includes a plurality of receptacles which can receive free ends of the conductors of the unused sets of wires and hold them safely in an electrically and physically isolated location inside the terminal block 36 until they are needed. The wires are held releasably in terminal block 36 by a locking device. In the preferred embodiment, the locking device comprises a plastic set screw which is received in a threaded opening in a wall of terminal block 36 to exert a clamping force on the free end of at least one of the conductors when the set screw is tightened.

The overall voltage rating of each of the capacitors in each array 63A, B, and C must be sufficient to safely withstand the voltage that will be present across each capacitor, regardless of which one of the tap points 91A, B, C, 92A,B,C or 94A,B,C is connected to the line of load 47 at any given time. As noted above, although each one of capacitors 91A,B,C-94A,B,C is represented as a single capacitor in FIGS. 2 and 3, each can be implemented as more than one capacitor connected in any suitable series and/or parallel combination.

The capacitance of the capacitors in array 63 are preferably selected to provide a sufficient high impedance at the applicable power line frequency that only a relatively small current flows in capacitor array 63 regardless of which one of the tap points 91, 92, 93 or 94 is connected to the power line which supplies load 47 at any given time. For example, in a preferred embodiment about fourteen (14) milliamps flows through series array 63 when taps 91A,B,C are coupled to a 4160 VAC line. The ones of the series of capacitors 71, 72, 73, 74 through which current flows, depending on which one of the tap points 91-94 is connected to the power line 43, preferably present on overall series impedance that causes most of the power line voltage to be dropped across those capacitors. The voltage and current delivered by way of array 63 should be sufficient however to assure proper operation of the monitoring and diagnostic circuit 54 whose power and phase voltage indication and test circuit 107 will now be described with reference to FIG. 4. As indicated in FIGS. 3 and 4, circuit 107 is coupled to capacitor array 63 at nodes 135A, B, C.

Figure 4:
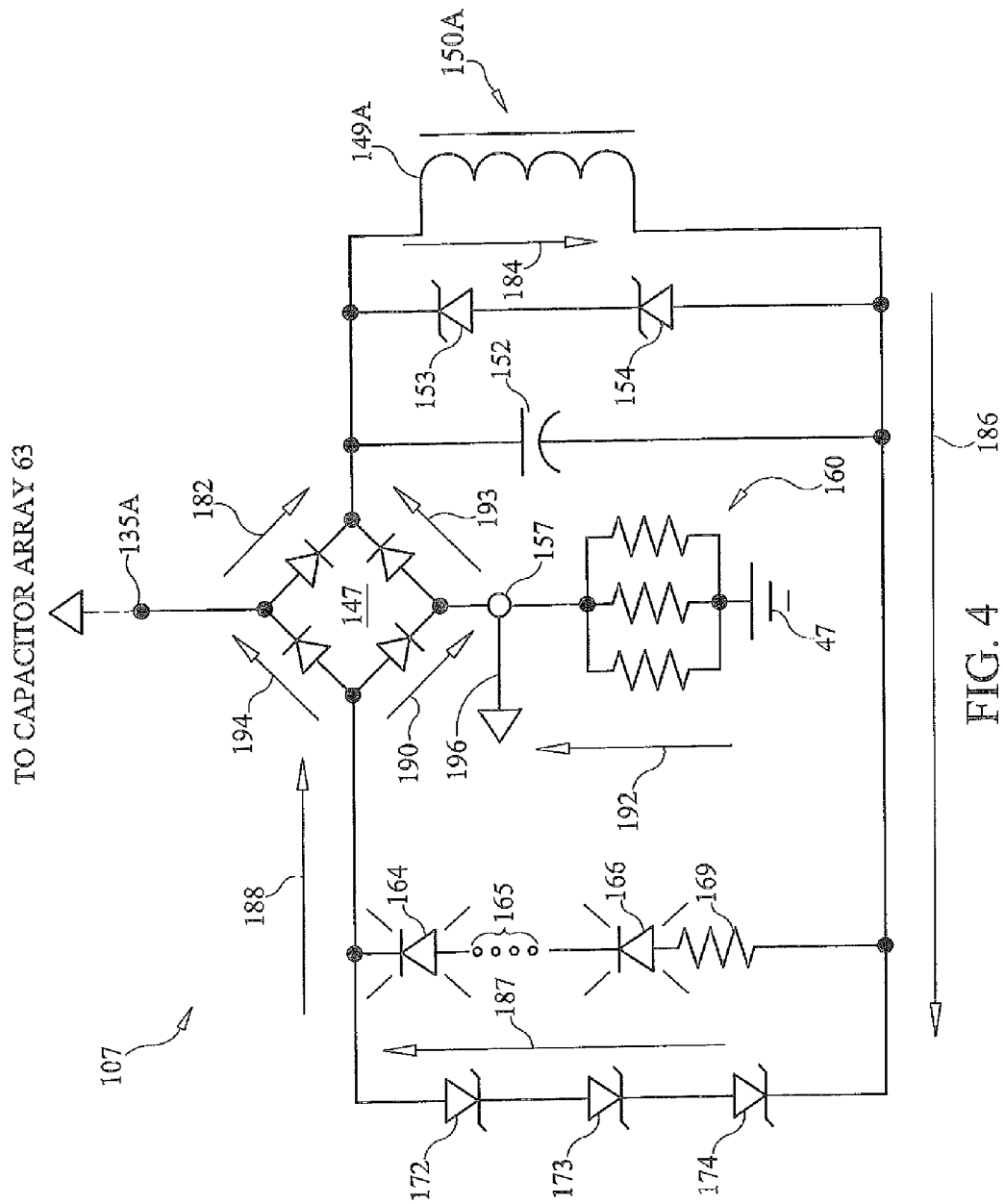
FIG. 4 is an electrical schematic illustrating the power and phase voltage circuit portion of the diagnostic and monitoring circuit of FIG. 2.

FIG. 4 illustrates one of the three identical power and phase voltage indication and test circuits 107. In FIG. 4, the portion of circuit 107 relating to phase A is shown, it being understood that the circuit 107 of the preferred embodiment includes identical portions for phases B and C, respectively.

Node 135A is connected to a full wave rectifier 147, one D.C. terminal of which is connected to the coil 149 of a relay 150. A capacitor 152 and a pair of series-connected zener diodes 153 and 154 are connected mutually in parallel with one another and coil 149. The other AC terminal of rectifier 147 is connected to a test point 157 which is coupled to ground by way of a resistor network 160. The remaining D.C. terminal of rectifier 147 is connected to a series of light emitting diodes (LEDs) 164, 165, 166 in series with a current limiting resistor 169. The series of dots shown in FIG. 4 at reference numeral 2 are used to indicate additional LEDs. In the preferred embodiment, a series of seventeen (17 each) LEDs are connected in series. The LEDs 164, 165 and 166 are in a cluster to form indicator light 15A Because they are connected in series, all seventeen LEDs can be fully illuminated with no more electrical current than would be required a single LED of the same given type. A series of three (3 each) zener diodes 172, 173 and 174 are connected in parallel across LEDs 164, 165 and 166 and resistor 169. The impedance presented by the resistor network is selected such that the voltage appearing at the test point 157 will be fraction, and preferably one whose numerator is unity and whose denominator is a factor of ten, of the voltage appearing at tap point 91A, 92A, 93A or 94A is connected to the power line 43 at a particular time, regardless of which one of those tap points is connected to power line 43. In the preferred embodiment, the resistance of the resistor network 160 is selected to downscale the power line voltage by a factor of one thousand. Accordingly, a line voltage of 4,160 VAC will generate a safely-measurable voltage of 4.16 VAC at test point 157.

In normal operation, during the positive half-cycle on phase A, current flows from line 43 capacitor array 63A and through full wave rectifier 147 in the direction indicated by arrow 182. The current is limited by the impedance of the capacitors 71A-74A so that both the current and the voltage applied to rectifier 147 are low. Current passes through the coil 149 of relay 150 as indcted by arrow 184 so that relay coil 149 normally remains energized. Currents flowing through coil 149 and zeners 153, 154 combine as indicated by arrow 186 and flow through the series of LEDs 164-166 which form indictor light 15A, as indicated at 187 causing them to remain lighted as an indication of normal operation. Excess current is routed through zener diodes 172-174. The current flowing through zener diodes 172-174 recombines with the current flowing through LEDs 164-166 to re-enter rectifier 147 as indicated by arrow 188 from which it is conducted via test point 157, as shown by arrow 190, through resistor network 160 to ground.

In normal operation of circuit 107 during the negative half-cycle, current flows from ground through resistor network 160 as indicated by arrow 192 and is conducted toward the coil 149 of relay 150 through rectifier 147 by the path indicated by arrows 193 and 184. current flows in the manner described above with reference to arrows 184-188. During the negative half-cycle however, current 188 is conducted from rectifier 147 to the capacitor array 63 through the path indicated by arrow 194. Current then enters the line 43A by way of capacitor array 163.

If the flow of current is interrupted, relay 150 becomes de-energized and LEDs 164-166 making up indicator light 15A will be extinguished. Any extinguished indicator light(s) 15A, 15B and/or 15C indicate either a loss of phase power, a grounded phase, a failed SPD or improper installation of unit 10. Loss of phase will also be indicated by loss of voltage at test point 157. The voltage at test point 157 can be monitored locally or, if desired a wire lead 196 can be routed exteriorly of housing 13 so that line-to-ground phase voltage can also be monitored remotely as indicated at box 119 in FIG. 2.

Figure 5:
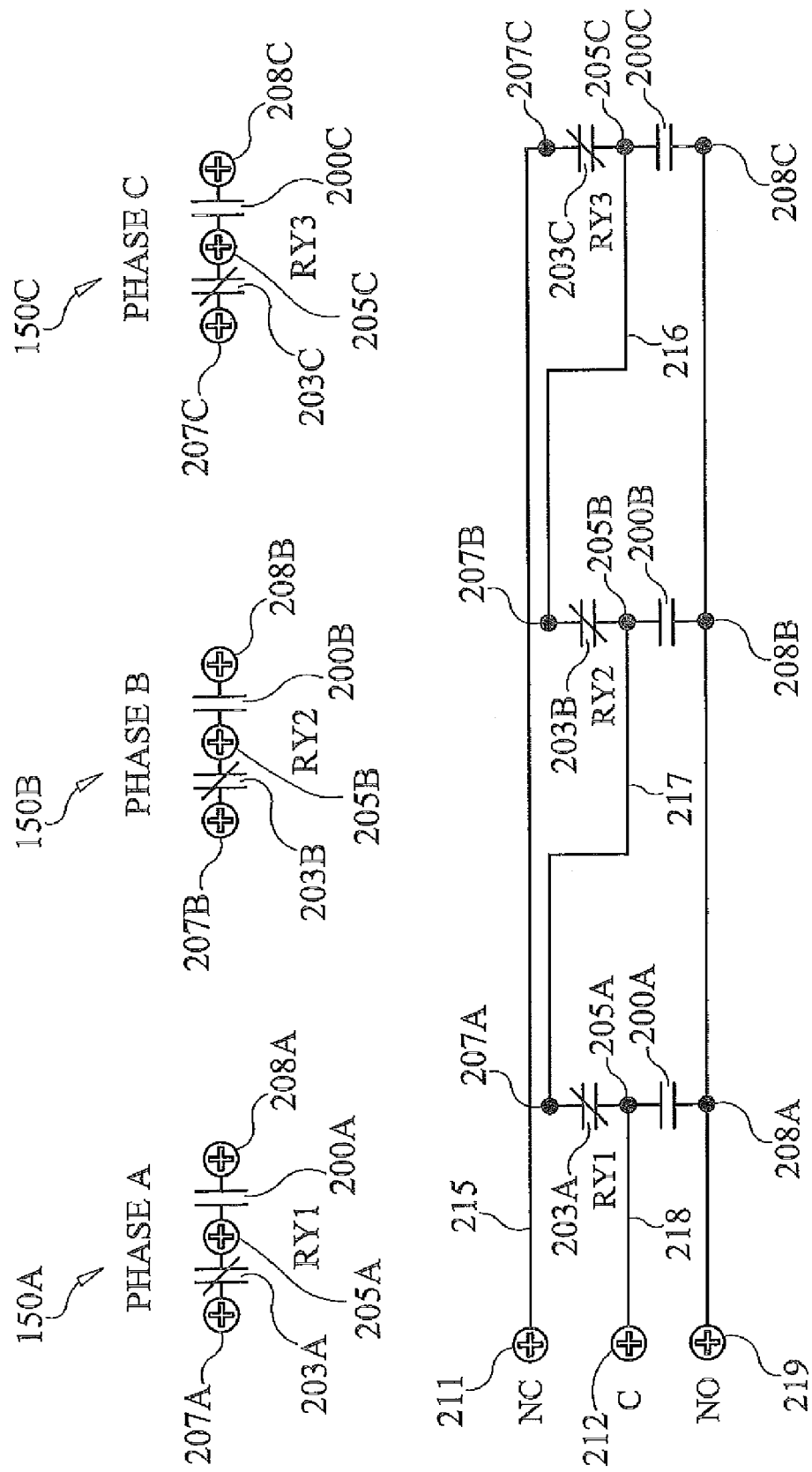
FIG. 5 is an electrical schematic of the relay circuit portion of the diagnostic and monitoring circuit of FIG. 2.

As shown in FIG. 5, relay 150A is one of three separate relays 150A, 150B, 150C associated with relay circuit 109. Each includes a respective normally open contact 200A, B, C and a respective normally closed contact 203A, B, C which are connected in series at a common terminal 205A, B, C and each terminals 207A, B, C and 208A, B, C are connected electrically in series with one another between a "normally closed" indication terminal 211 and a common terminal 212 by way of conductors 215-218. Normally open contacts 200A are connected in parallel across common terminal 212 and a "normally open" indication terminal 219. Normally open contacts 200A are connected in parallel with a series combination of normally open contacts 200B and normally closed contacts 200B are in turn connected in parallel with a series combination of normally open contact 200C and normally closed contact 203B.

Relay circuit 109 facilitates monitoring of each individual phase and TVSPD unit 10 overall. Terminals 211, 212 and 219 and/or any other desired ones of terminals 207A, B, C; 205A, B, C; 208A, B, C can be monitored locally or coupled to leads routed to remote monitoring site 121. Terminals 211 and 212 will change from a closed circuit to an open circuit state in the event any phase loses power or becomes grounded. Power loss or grounding of each phase can also be determined by monitoring the status of contacts 203A, B and/or C individually.

Figure 6:
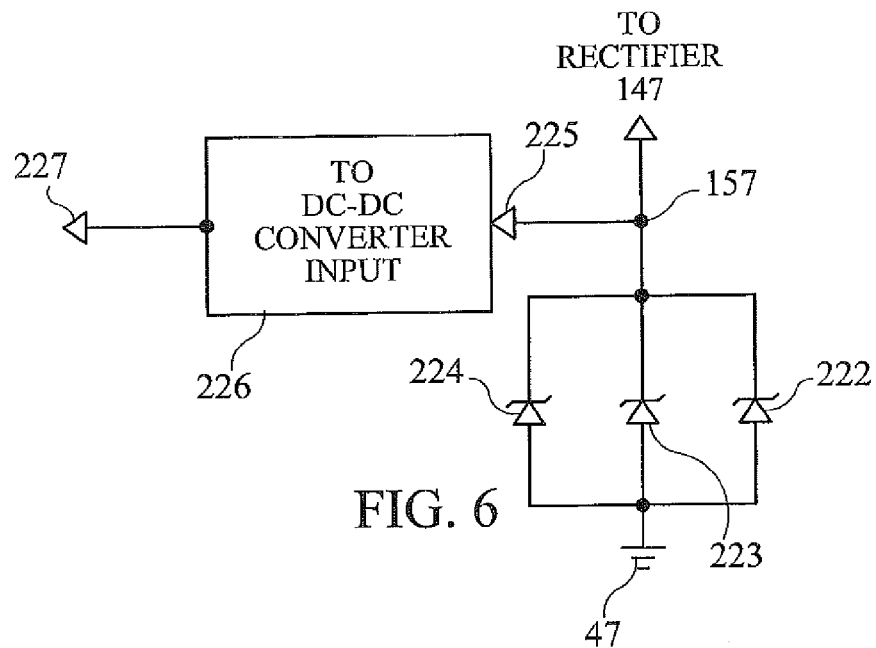
FIG. 6 is an electrical schematic illustrating an alternative form of a portion of the circuit shown in FIG. 4 showing a modification thereof to be used when the TVSPD of FIG. 1 is to be provided with a surge counter.

As an option, TVSPD 10 can include a surge counter circuit 111 to count and display the number of transient overvoltage events which occur over time. If this option is elected, the resistors in resistor network 160 of circuit 107 are removed and replaced with one or more zener diodes 223, 224, 226 as shown in FIG. 6 to maintain a voltage at point 157. Thus, the voltage at test point 157 will not represent phase voltage if the optional surge counter is provided. To provide power to surge counter circuit 111, the point 157 of the three circuits 107 associated with each of the three phases are preferably tied together and applied to the input 225 of a DC-to-DC switching power supply 226 of any type suitable for providing regulated DC power to surge counter circuit 111 by way of a DC output 227. Surge counter circuit 111 will now be described in further detail with reference to FIGS. 7 and 8.

Figure 7:
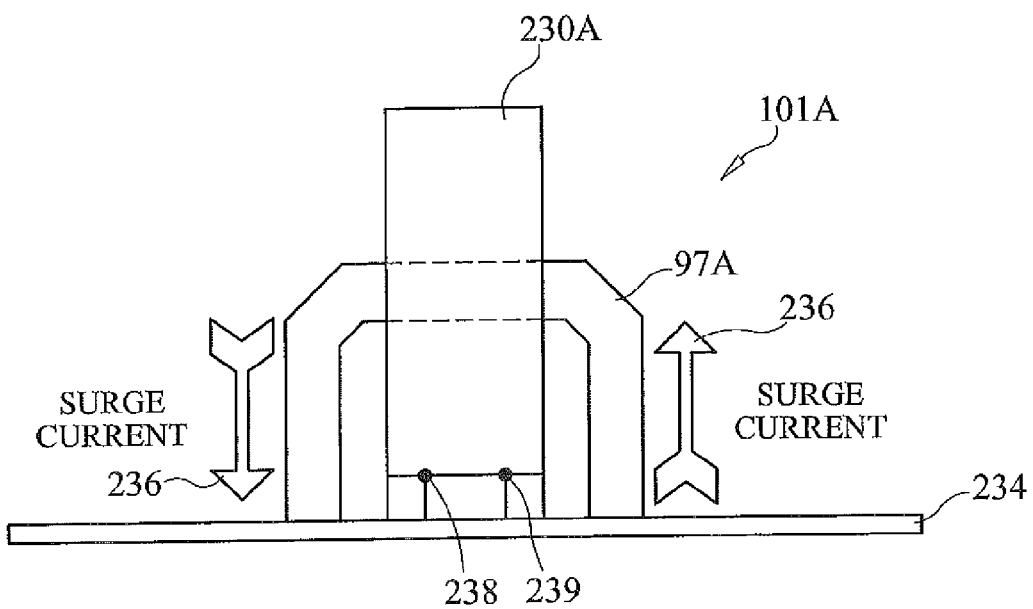
FIG. 7 is an illustration of an example of an overcurrent sensor.

As shown in FIG. 7, the surge current sensors 101A of the preferred embodiment takes the form of a current transformer whose secondary winding is output coil 230A, and whose primary is a sensing link 97A which passes through a central opening in secondary coil 230A. Coil 230A and link 97A are both preferably mounted on a printed circuit board 234. Sensor 101A is coupled to multi-tap overvoltage protection circuit 52 so that link 97A is interposed electrically in series with SPD array 61A as indicated in FIG. 3 so that a surge current which flows through SPD array 61A flows through link 97A and thereby induces an electrically isolated surge signal at the outputs 238, 239 of coil 230A.

Figure 8:
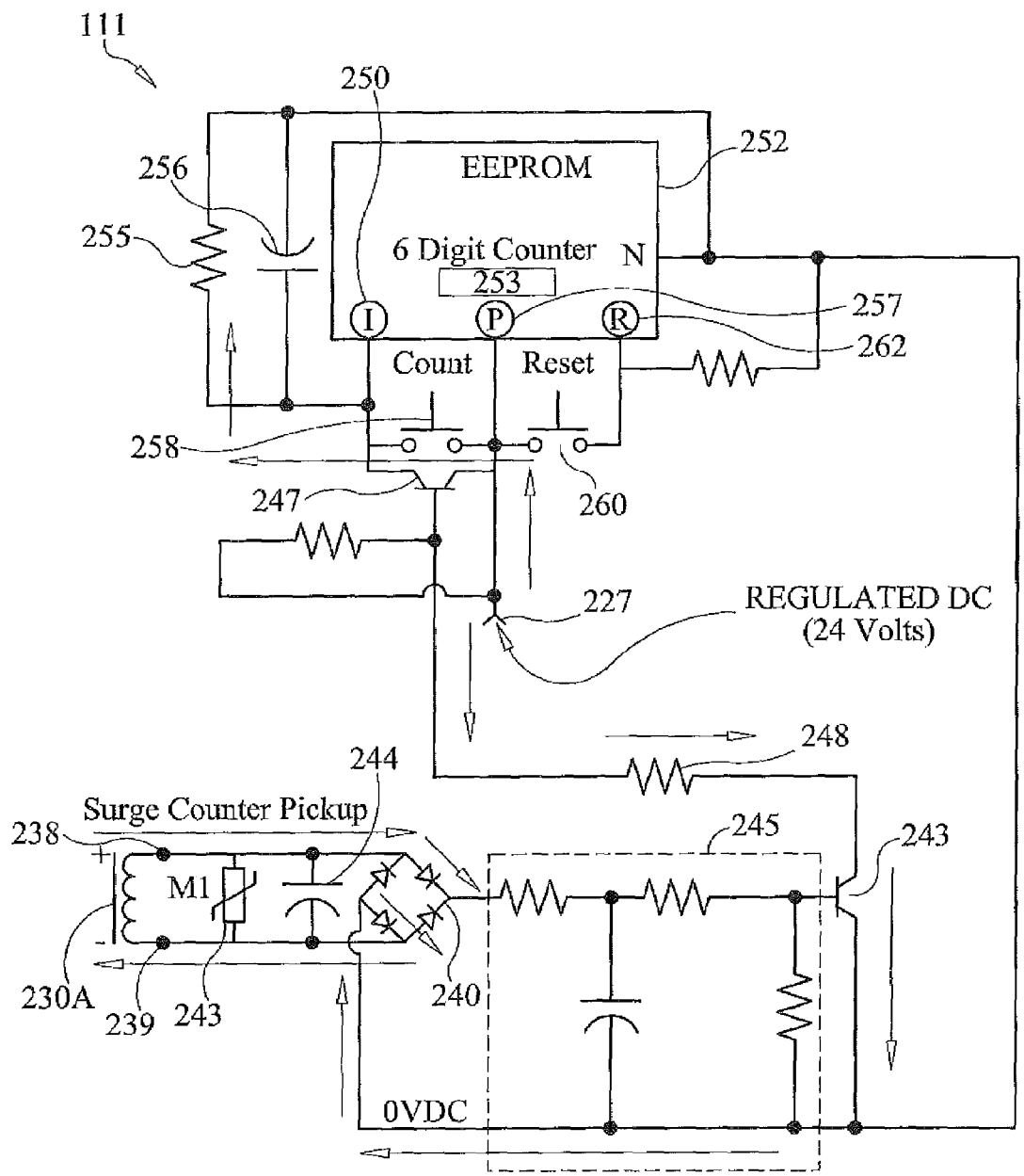
FIG. 8 is an electrical schematic of the surge counter circuit portion of the diagnostic and monitoring circuit of FIG. 2.

As illustrated in FIG. 8, outputs 238 and 239 of coil 230A are connected to a diode bridge 240 in parallel with a transorb 243 and a capacitor 244. Transorb 243 serves as a voltage limiter while capacitor 244 extends the duration of the surge signal as applied to bridge 240. the output side of bridge 240 is coupled to the base of an NPN transistor 243 by way of an R-C network 245. R-C network 245 which both limits the current applied to transistor 243 and serves as a low pass filter which attenuates high frequency signals while conducting low frequency signals to reduce the possibility of false triggering of the counting circuit. Transistor 243 serves a current amplifier which provides a current gain factor of about one hundred (100×). The collector of transistor 243 is coupled to the base of a PNP transistor 247 by way of a current-limiting resistor 248.

Transistor 247 provides additional current gain such that the current flowing between its emitter and collector in response to a surge signal is about one hundred times (100×) the current flowing to ground through transistor 243. This results in application of a signal to the input pin 250 of a six digit EEPROM (non-volatile memory) integrated counter 252 which causes the present count value to increment by one each time a surge signal is applied to surge counter circuit by surge current sensor 101A as a result of an overvoltage transient appearing on phase A of line 43. Counter 252 includes an alphanumeric display 253 for visually displaying the present count value representing the number of transient overvoltage events since the counter 252 was last re-set.

The input pin 250 is coupled to ground by way of a pull-down resistor 255 which holds the input pin 250 at a low voltage except when transistor 247 conducts in response to a surge signal while a capacitor 256 is connected between pin 250 and ground for filtering.

For test purposes, a normally-open pushbutton switch 258 is connected between input pin 250 and the power input pin 257 of counter 252. Pressing the button 258 causes the count value to increment by one with each press to confirm that counter 252 and its display 253 are operating properly. A reset pushbutton 260 connected between power input pin 257 and a reset pin 262 of counter 252 causes the count of counter 250 to reset to zero when pressed.

While the invention has been described with reference to preferred embodiments, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims and all legal equivalents.

What is claimed is:

1. An electrical surge protection apparatus for protecting at least one component of an electrical system from a transient overvoltage condition, the electrical system being operable at a normal nominal operating voltage, said apparatus comprising:
    an SPD array having at least one set of surge protection devices (SPDs) per phase, each said set of SPDs having at least two SPDs connected electrically in series with one another, said SPD array having a node electrically coupleable to a ground for conducting current flowing in said SPD array as a result of a transient overvoltage condition to said ground, said SPD array including at least two tap points electrically in common with terminals on electrically opposite sides of said SPDs, at least one of said SPDs being coupled electrically between respective ones of said tap points, each of said sets of tap points corresponding to one of at least two different nominal normal operating voltages at least one of which corresponds to a normal nominal operating voltage of the electrical system, and
    at least two sets of electrical conductors, each of said sets of electrical conductors being electrically coupled to a respective one of said sets of tap points for electrically coupling the electrical system to a user selectable one of said sets of said tap points which corresponds to the normal nominal operating voltage of the particular electrical system to which the apparatus is to be operably coupled.

2. The apparatus of claim 1 wherein said at least two sets of electrical conductors are included in a wiring pigtail, said pigtail having an end connected to said SPD array, said pigtail further having a free end which extends outwardly from a housing within which said SPDs are physically located, each of said sets of electrical conductors corresponding to a different respective said normal nominal operating voltage.

3. The apparatus of claim 2 further comprising a terminal block disposed at said free end of said wiring pigtail, said terminal block including at least one set of fully electrically insulated receptacles, said terminal block including a releasable locking device disposed in operable relation to at least one of said receptacles for selectively releasably holding ends of said conductors of at least one of said sets of conductors in an electrically insulated and physically isolated location within at least one of said receptacles.

4. The apparatus of claim 3 wherein said locking device comprises a set screw formed of electrically insulated material and, a threaded opening formed in a wall of the terminal block for receiving said set screw to exert a clamping force for holding said at least one of said conductors at said location.

5. The apparatus of claim 1 further comprising, a capacitor array having a plurality of capacitors connected electrically in series with one another at two or more nodes, at least one of said capacitors being electrically coupled between at least two of said nodes, each of at least two of said nodes being electrically coupled to respective ones of said tap points, and
    a circuit for providing at least one indication of at least one predetermined condition, said circuit being electrically coupled to said capacitor array, said capacitor array providing power to said circuit at a voltage and current suitable for operating said circuit irrespective of which one of said tap points is connected to said electrical system at any said given time at the normal nominal operating voltage which corresponds to said one of said tap points.

6. The apparatus of claim 5 wherein said circuit comprises a test point and a network electrically connected to said test point, said network having an impedance selected to impose a voltage at said test point which corresponds to a predetermined fraction of the actual line voltage of the electrical system.

7. The apparatus of claim 6 wherein said fraction is a fraction whose denominator is a factor of ten.

8. The apparatus of claim 1 further comprising a re-settable counter for providing an indication of how many transient overvoltage events have taken place since said counter was re-set.

9. The apparatus of claim 8 further comprising a current transformer whose primary is connected electrically in series with said SPD array and whose secondary is electrically coupled to said circuit to provide a signal for triggering said counter in response to a transient overvoltage event.

10. The apparatus of claim 5 further comprising a relay circuit which includes a plurality of sets of dry contacts for providing a remote indication of said condition.

11. The apparatus of claim 1 further comprising a capacitor array comprised of at least two capacitors connected electrically in series with one another, each of said capacitors being electrically coupled to a respective one of said tap points, and
   a circuit for providing at least one indication of at least one predetermined condition, said circuit being electrically coupled to said capacitor array, said capacitor array providing power to said circuit at a voltage and current suitable for operating said circuit irrespective of which of said tap points is connected to said electrical system at any given time.

12. The apparatus of claim 1 wherein said SPD array comprises a three-phase array of SPD's.

13. The apparatus of claim 12 wherein said SPD array comprises three legs which are connected to one another in a grounded "Y" configuration, each of said legs including at least two of said SPDs.

14. An electrical surge protection apparatus for protecting at least one component of an electrical system from a transient overvoltage condition, the electrical system being operable at least one normal nominal operating voltage, said apparatus comprising:
   an SPD array having at least two surge protection devices (SPDs) connected electrically in series with one another, said SPD array having a node electrically coupleable to a ground for conducting current flowing in said array as a result of a transient overvoltage condition to said ground, said SPD array including at least two tap points, at least one of said SPDs being coupled electrically between respective ones of said tap points, each of said tap points corresponding to one of at least two different nominal normal operating voltages at least one of which corresponds to a normal nominal operating voltage of the electrical system;
   a capacitor array comprised of at least two capacitors connected electrically in series with one another, each of said capacitors being electrically coupled to a respective one of said tap points, and
   a circuit for providing at least one indication of at least one predetermined condition, said circuit being electrically coupled to said capacitor array, said capacitor array providing power to said circuit at a voltage and current suitable for operating said circuit irrespective of which of said tap points is connected to said electrical system at any given time.

15. The apparatus of claim 14 further comprising at least two sets of electrical conductors, each of said sets being electrically coupled to a respective one of said tap points for electrically coupling the electrical system to a user selectable one of said tap points which corresponds to the normal nominal operating voltage of the particular electrical system to which the apparatus is to be operably coupled.

16. The apparatus of claim 14 wherein said SPD array comprises a three-phase array of SPD's.

17. The apparatus of claim 16 wherein said SPD array comprises three legs which are connected to one another in a grounded "Y" configuration, each of said legs including at least two of said SPDs.

* * * * *